Feb. 15, 1944.　　H. W. HAWKER ET AL　　2,341,987
DECORTICATING MACHINE
Filed Dec. 2, 1942　　6 Sheets-Sheet 2

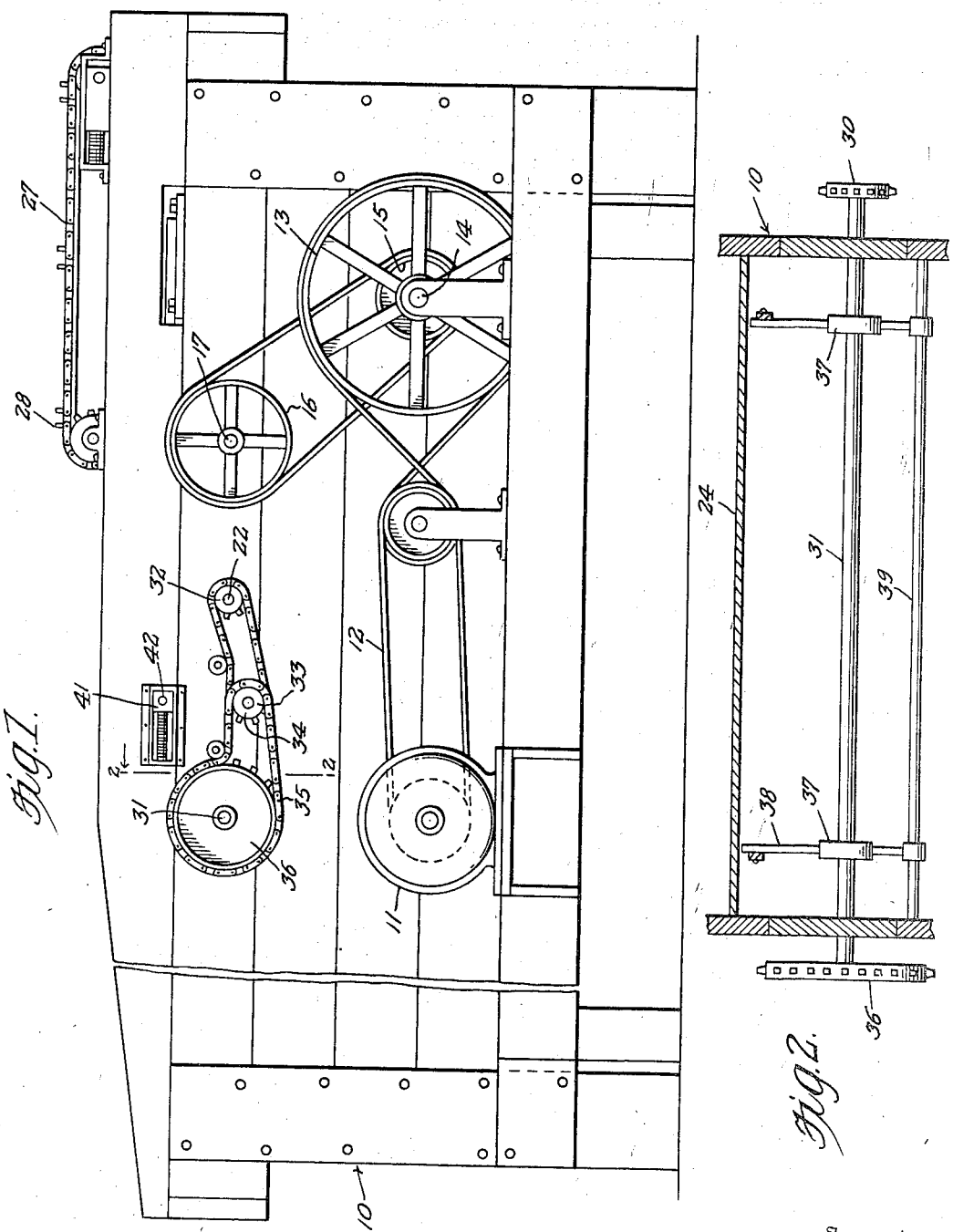

Inventors
*H. W. Hawker*
and *J. L. White*
By *A. D. Adams*
Attorney

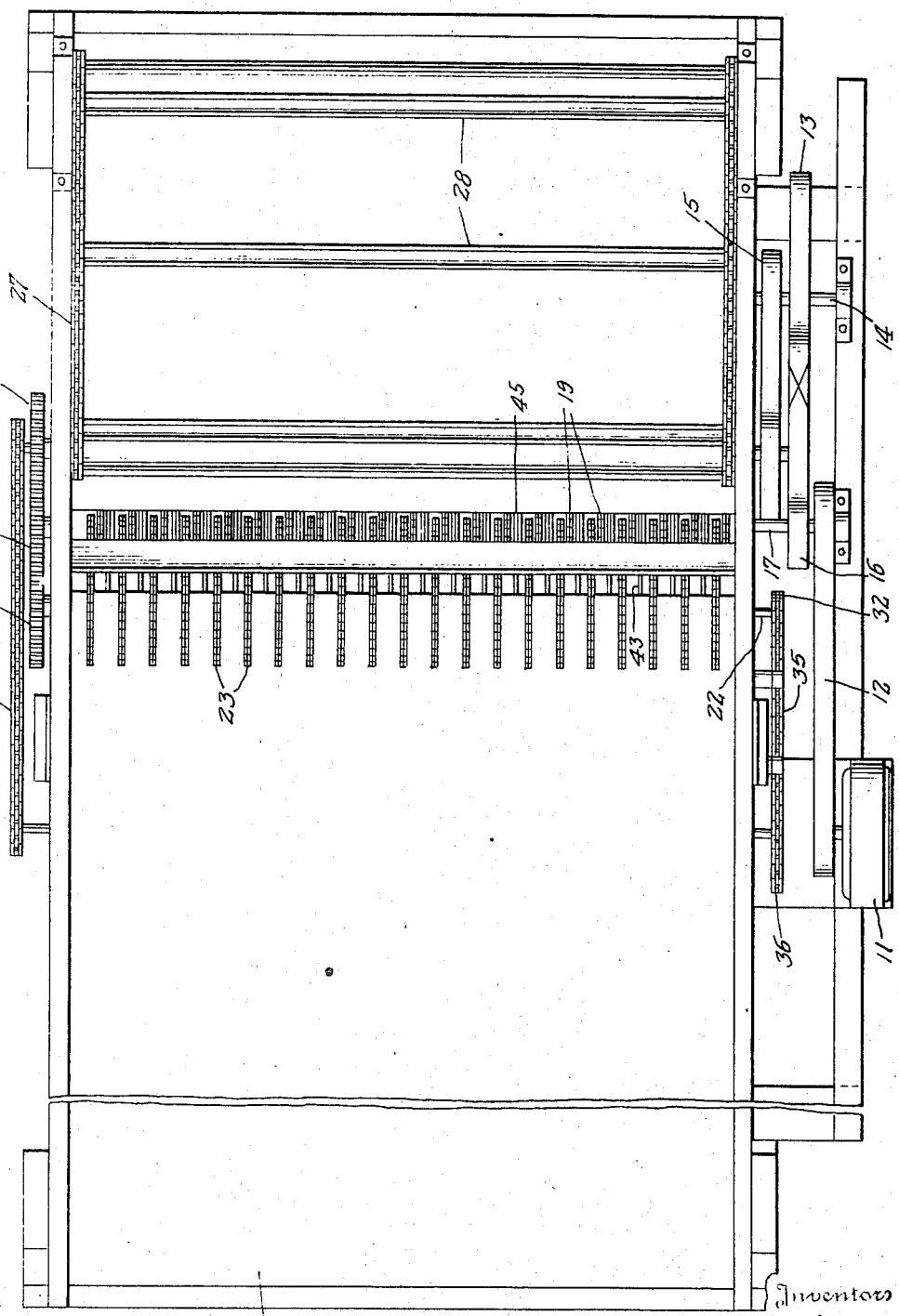

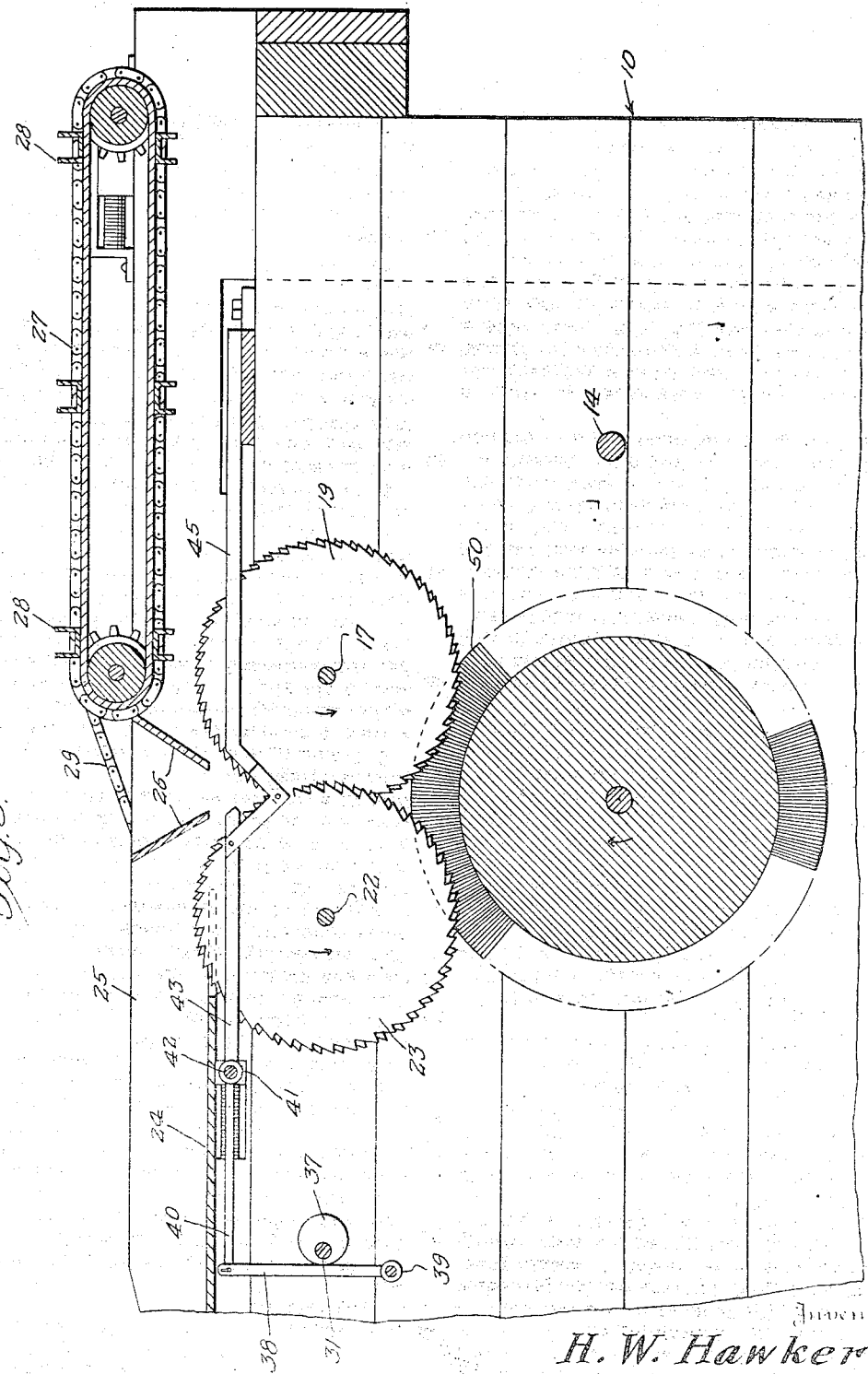

Feb. 15, 1944.   H. W. HAWKER ET AL   2,341,987
DECORTICATING MACHINE
Filed Dec. 2, 1942   6 Sheets-Sheet 5
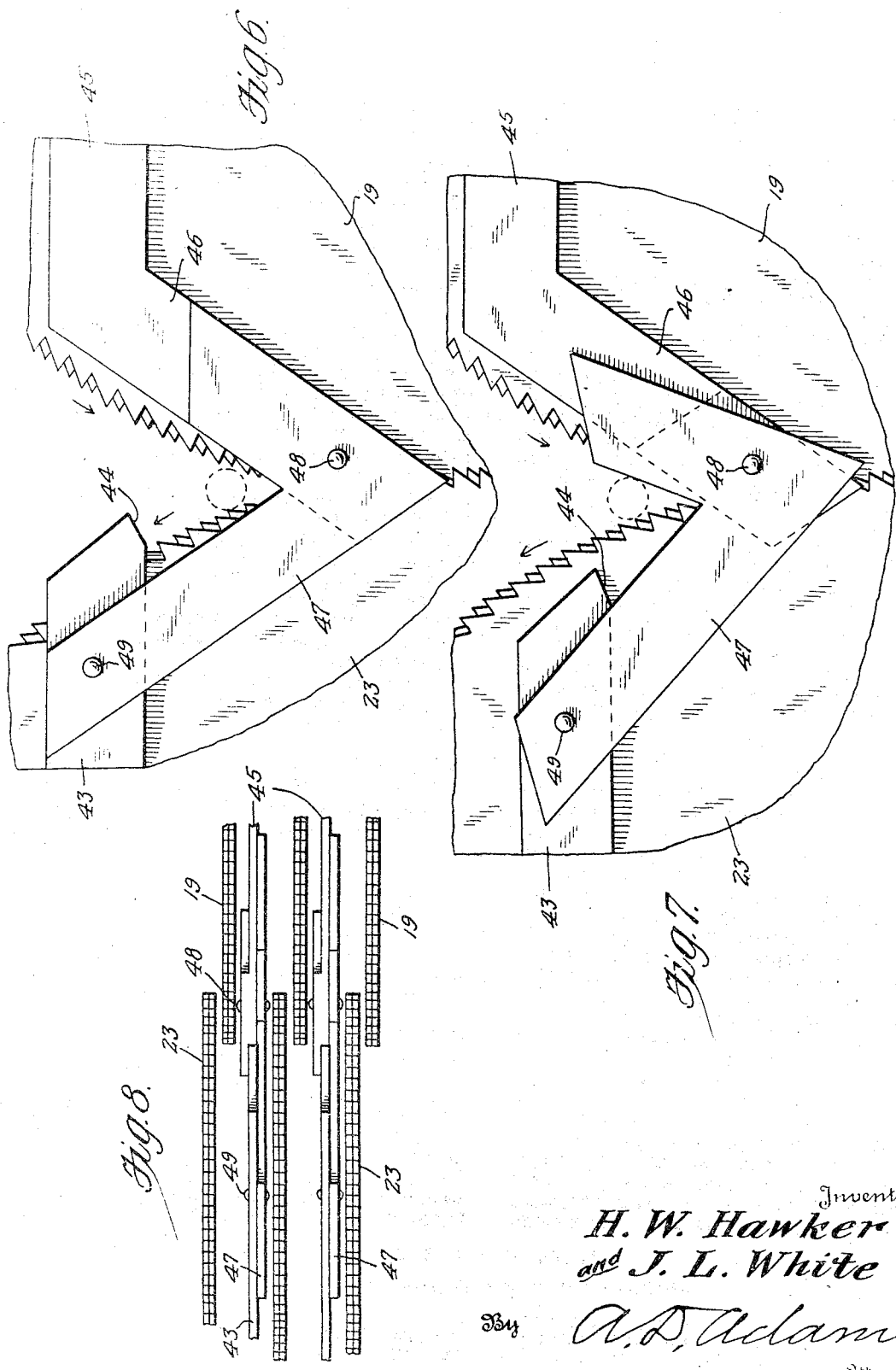
Inventors
H. W. Hawker
and J. L. White
By A. D. Adams
Attorney

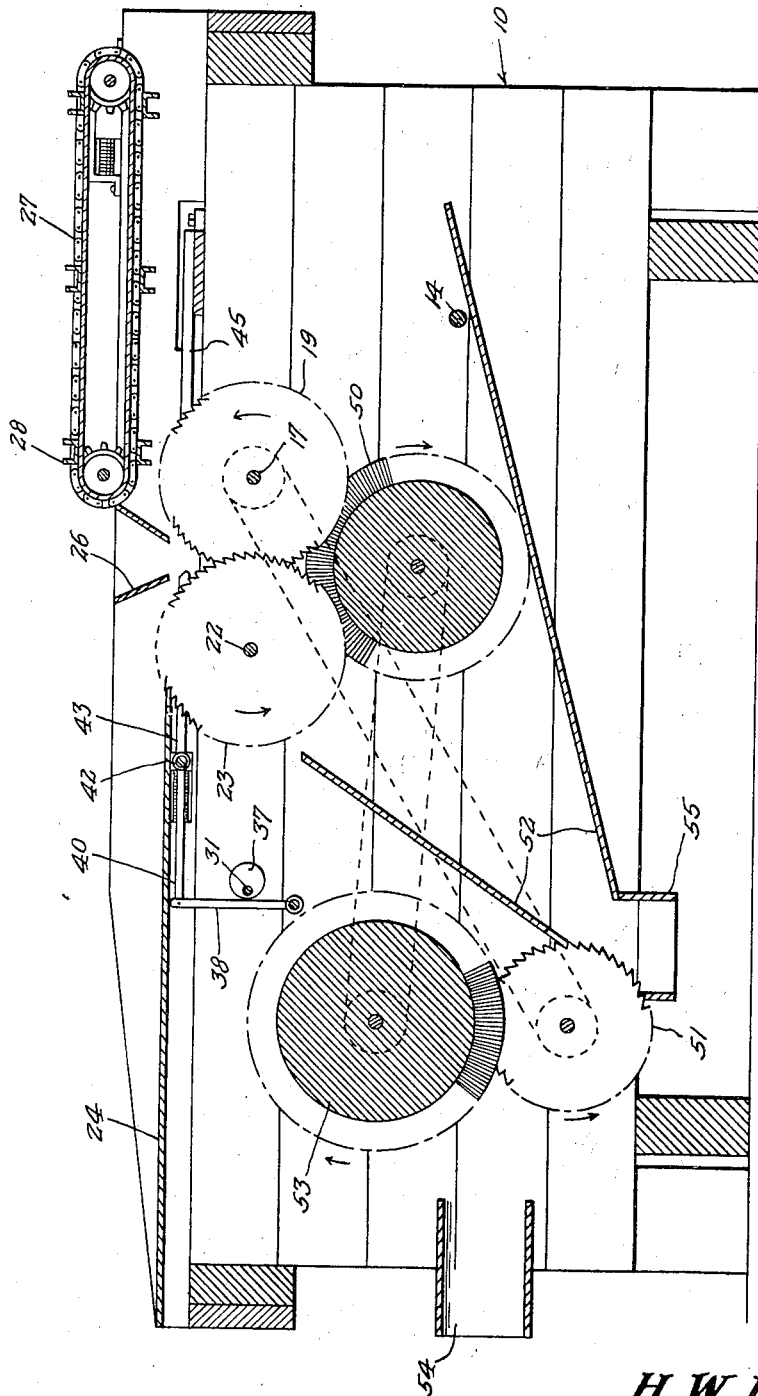

Patented Feb. 15, 1944

2,341,987

UNITED STATES PATENT OFFICE 2,341,987

DECORTICATING MACHINE

Herman W. Hawker, Teague, and James L. White, Butler, Tex.

Application December 2, 1942, Serial No. 467,632

10 Claims. (Cl. 19—24)

This invention relates to a decorticating machine for removing the bark from ramie and similar bast fiber plants. The main idea is to provide a machine of this type for the treatment of ramie while the stalk is in the green state. Since ramie and most of the bast fibers grow in wet climates with attendant high humidity, the usual dry decorticating process requires artificial drying of the plant before it can be decorticated. When the plants are thus dried the valuable fibers are more or less solidly encased in the dried gum which surrounds them. Hence, much stronger chemicals are necessary to dissolve the gum than is the case when the stalks are in the green state. It has been found that decortication of the stalks in the green state produces a fiber of greater tensile strength and durability.

Another aim of this invention is to provide a machine of this type which prepares the green stalks for the degumming process immediately after they are gathered and brought in from the fields.

Another aim is to provide a decorticating machine having a novel arrangement of staggered saw teeth and means to feed the ramie stalks between sets of saws to permit clean removal of the bark while the stalks are undergoing a whirling or slow rotation imparted by the saws. The idea is to confine the stalks between the sets of saws for a timed interval and to provide means for the automatic ejection or removal of the stalks from the saws after the bark has been removed. One of the characteristic features of the mechanism for feeding and ejecting the stalks involves the provision of stationary and floating ribs arranged between pairs of adjacent saws and ejecting dogs associated with the floating ribs to cause the automatic ejection or removal of the decorticated stalks by the action of one set of saws.

Other aims and advantages of the invention will appear in the specification, when considered in connection with the accompanying drawings, wherein:

Fig. 1 is a side elevation of a machine embodying the invention;

Fig. 2 is a fragmentary sectional view taken on the line 2—2 of Fig. 1 showing the operating mechanism for the floating ribs;

Fig. 4 is a top plan view of the machine shown in Fig. 1;

Fig. 5 is a fragmentary vertical sectional view of the machine shown in Fig. 1 on an enlarged scale;

Fig. 6 is a fragmentary side elevation of an enlarged scale showing the position of the floating and stationary ribs during the decorticating action of the saws;

Fig. 7 is a view similar to Fig. 6 showing the parts in ejecting position;

Fig. 8 is a fragmentary top plan view showing the staggered arrangement of the parts; and Fig. 9 is a vertical sectional view of a slightly modified form of the decorticator shown in Fig. 1.

Figure 3:
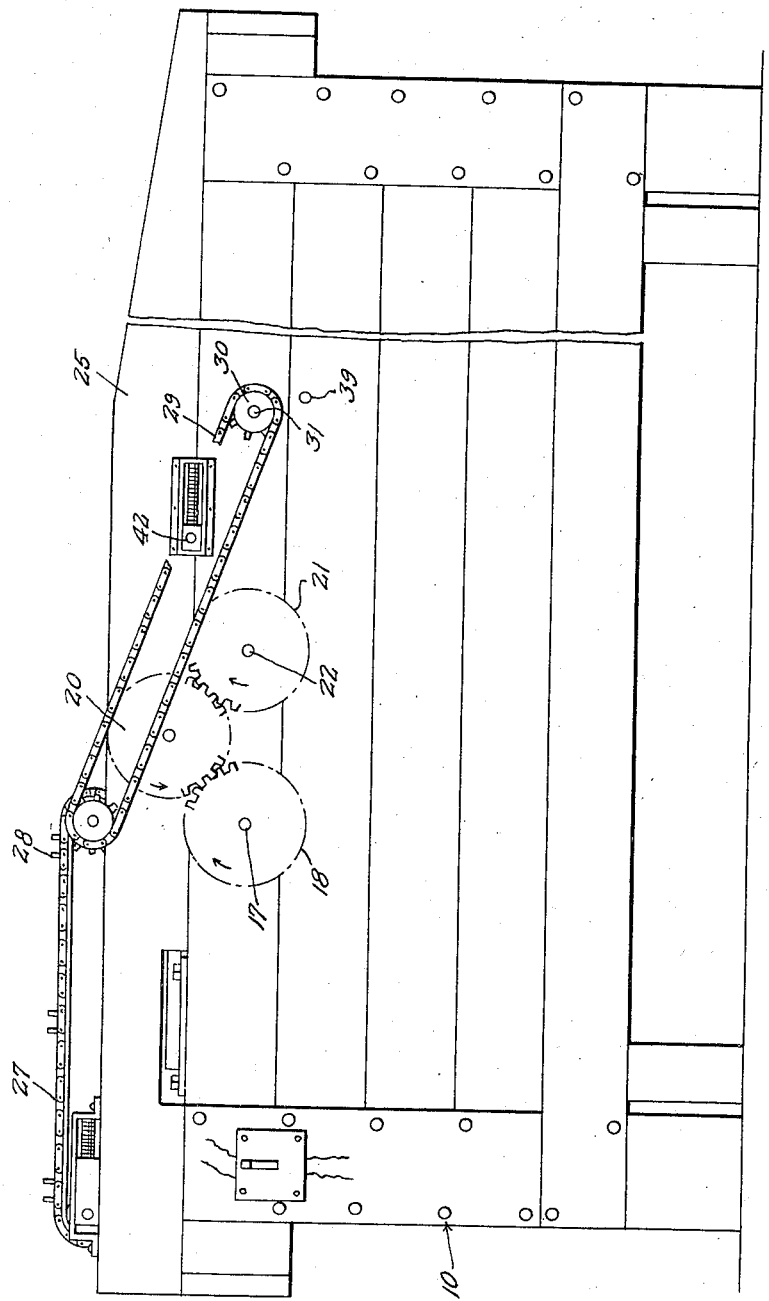
Fig. 3 is a side elevation of the machine taken on the opposite side from Fig. 1.

Referring particularly to the drawings and to that form of the machine shown in Fig. 1, the mechanism is carried by a suitable frame 10 preferably, though not necessarily, having closed side and end walls so that the removed bark will be confined thereby. In this instance, the mechanism is driven by a suitable motor 11 having a chain or belt drive 12 connected through a countershaft and pulleys to a main pulley 13 driven at the desired speed. On the shaft 14 of the pulley 13 there is arranged a small driving pulley 15 connected by a belt or chain drive to a pulley 16. The shaft 17 of the pulley 16 extends through the frame and is shown as driving a gear 18. The shaft 17 is also shown as carrying a series of spaced decorating saws 19, later to be described. The gear 18 is shown as being connected by an idler or intermediate gear 20 to a second gear 21 on a saw shaft 22 which carries another series of decorticating saws 23 rotating in the same direction as the saws 19 and arranged in staggered relation with the saws 19 as best shown in Fig. 5.

Referring now to the sets of saws 19 and 23, each one is shown as being composed of two adjacent disks having staggered teeth to present more cutting edges or penetrating points than would be provided by single toothed disks. However, it is to be understood that single disks with double sets of teeth arranged in staggered relation or with one set of fine teeth may be employed in the same manner. These teeth are preferably pointed, so that they barely penetrate the bark or fiber portion of the stalk and snatch off the fiber, pulling it loose at the nodes of the stalk.

The arrangement of the opposite series or sets of saws is best shown in Fig. 4 and the direction of rotation of the saws is illustrated in Fig. 5. They are overlapped horizontally as shown in Fig. 5 to receive ramie stalks fed vertically and resting horizontally between them. Incidentally, the machine is shown as having an upper table surface 24 and opposite side frame members 25 carrying a trough shaped hopper or guide 26 through which the stalks are adapted to be fed directly between the saws. In this instance, the stalks are fed by an endless conveyor, in the form of a chain belt 27, having spaced channel guides 28 each arranged to receive a single stalk of ramie and deposit it in the hopper 26 in proper timed relation. The feeding mechanism may be driven in any suitable manner, but is shown as being driven by a sprocket chain 29 and a driving sprocket 30 on a cam shaft 31. The shaft 31 is conveniently driven by a small sprocket 32 on the end of the saw shaft 22 as best shown in Fig. 1. In this instance, the sprocket 32 has a chain drive connected to a countershaft 33 carrying a pair of sprockets 34, one of which is connected by a driving chain 35 to a large sprocket 36 on the cam shaft 31. The cam shaft is thus driven in proper timed relation to the saws and is here shown as carrying two cams 37, one at each side of the machine, to operate a pair of arms 38 carried by a shaft 39 arranged below the shaft 31. The arms 38 are connected by a pair of connecting rods or links 40 to spring pressed crossheads 41 carrying a shaft 42 to which a series of reciprocating or floating ribs 43 are connected, one between each adjacent pair of saws on the shaft 22. Of course the floating ribs may be reciprocated by any other suitable means, such as ordinary cranks (not shown). These ribs are adapted to extend to a point between the saws and have beveled holding noses or toes 44 to prevent the escape of a stalk of ramie when fed in between the saws.

As best shown in Figs. 5, 6 and 7, stationary ribs 45 are preferably adjustably secured to the top of the table or frame 10 and extend rearwardly between the front sets of saws 19 on the shaft 17, there being a stationary rib corresponding with each floating or reciprocating rib 43. These ribs may be adjusted and secured in place with their rear ends terminating short of the peripheries of the saws 19. They have downwardly and rearwardly bent ends 46 to which are pivotally connected V-shaped dogs 47 on pivot pins 48 or on suitable bearings. The rear legs of these dogs are also pivoted to the forward ends of the floating or reciprocating ribs 43 by pivot pins 49. The arrangement is such that when the floating ribs are in the position shown in Figs. 5 and 6, the ejecting dogs extend below the opposed teeth on the peripheries of the saws with the projecting forward ends of the floating ribs extending slightly into the space between the saws and below the guiding hopper or trough 26. The dogs are so disposed that they determine the depth of penetration of the saw teeth in a stalk held between the saws. It will be noted that the operating arms 38 for the floating ribs are then in contact with the low parts of the cams 37.

When the parts are in this position, a stalk of ramie is deposited in the space between the saws as shown in dotted lines in Fig. 6 and its bark is removed by the teeth of the respective saws. Since the saws rotate in the same direction, as indicated by the arrows in Fig. 5, the downward movement of the front set of saws starts the stalk to rotating and the teeth of the rear set of saws continue the rotation and, thus, cause the stalk to rotate rapidly, as if it is bounced from one set of saws to the other. The stalk cannot escape from the V-shaped space between the saws, because the projecting fingers 44 effectively confine it therein until the floating ribs are retracted by the action of the cams 37. When the floating ribs are retracted the fingers 44 move rearwardly and the front legs of the dogs 47 are pulled rearwardly to disengage the stalk from the teeth of the forward series of saws 19. Then, the teeth on the rear series of saws 23 eject the stalk to the rear of the machine where it may be deposited in a hopper or on the floor behind the machine. As soon as a decorticated stalk is ejected and the floating ribs return to their position shown in Fig. 6, another stalk is deposited between the saws to be decorticated.

The teeth of the saws carry the stripped fiber-containing bark around with them and the bark is removed from them by means of a brush 50 rotating in a direction opposite from the saws or clockwise as shown in Fig. 5, in much the same manner as lint is removed from the saws in a cotton gin. The removed fiber-containing bark is deposited in the space below the brush and may be removed from time to time or it may be delivered to a suitable hopper provided for that purpose. Incidentally, the brush 50 may be driven directly by the motor 11 or from any of the shafts shown in Fig. 1.

Referring now to Fig. 9, the decorticating mechanism there shown is the same as that disclosed in Fig. 1. In this instances, however, a third series of saws 51 is provided in the bottom portion of the machine frame to recover fibers from the woody fragments removed by the first two sets of saws. In this example, the fibers and fragments are delivered by the brush 50 into a hopper 52 and the saws 51 extend through narrow slits into the bottom portion of this hopper where they pick up the fibers and separate them from the woody fragments. The fibers are carried through the slits by the teeth of the saws 51 and they are removed from the saws 51 by a second brush 53, preferably driven at the same speed as the brush 50. They are delivered through a suitable chute 54 to the rear of the machine frame. The woody fragments or chips are held back by the slits and pass through a vertical chute 55 at the bottom of the hopper to a point below the machine frame. It is to be understood that the chips may be separated from the fiber below the front and rear sets of saws.

From the foregoing description, it will be seen that the machine is designed to decorticate green ramie stalks and prepare them for immediate treatment after they are gathered without waiting for them to be dried. The mechanism is entirely automatic after the stalks are deposited on the feeding conveyor. The machine thus saves considerable time in the treatment of stalks and reduces the cost of subsequent chemical treatment to remove the gum surrounding the most valuable fiber in the stalks. However, it is to be understood that the machine is not limited to the treatment of ramie, but can be used to decorticate other fibrous plants.

Obviously, the present invention is not restricted to the particular embodiment thereof herein shown and described. Moreover, it is not indispensable that all the features of the invention be used conjointly, since they may be employed advantageously in various combinations and subcombinations.

What is claimed is:

1. In a decorticating machine of the character described, a series of pairs of circular saws with the saws of each pair opposed to and overlapping each other; feeding mechanism for depositing individual fibrous stalks between the saws; a plurality of stationary ribs between one series of saws; a plurality of floating ribs between the other series of saws; dogs connected to the ribs and adapted to be operated by the floating ribs to eject the decorticated stalks; and means to operate the floating ribs in timed relation to the feeding of the stalks.

2. In a decorticating machine of the character described, a series of pairs of circular saws with the saws of each pair opposed to and overlapping each other, each saw consisting of two contacting disks, and each disk being provided with a set of teeth on its periphery, the teeth of one set being staggered with respect to those of the other set.

3. In a decorating machine of the character described, a series of pairs of circular saws with the saws of each pair opposed to and overlapping each other; feeding mechanism for depositing individual stalks between the saws; a plurality of stationary ribs between one series of saws; a plurality of floating ribs between the other series of saws; and dogs connected to the ribs and adapted to be operated by the floating ribs to eject the decorticated stalks.

4. In a decorticating machine of the character described, a series of pairs of circular saws with the saws of each pair opposed to and overlapping each other; feeding mechanism for depositing individual stalks between the saws; a plurality of stationary ribs between one series of saws; a plurality of floating ribs between the other series of saws; and V-shaped dogs each having one of its arms pivotally connected to a floating rib and the other arm pivotally connected to a stationary rib.

5. In a decorticating machine of the character described, a series of pairs of circular saws with the saws of each pair opposed to and overlapping each other, feeding mechanism for depositing individual stalks between the saws; a plurality of stationary ribs between one series of saws; a plurality of floating ribs between the other series of saws; and V-shaped dogs, each having one of its arms pivotally connected to the end of a stationary rib and the other end pivotally connected to a floating rib adjacent to its end, thereby leaving a portion of the ends of the floating ribs exposed to act as abutments for the stalks during decortication.

6. In a decorticating machine of the character described, a series of pairs of cooperating saws for removing fibrous bark and arranged on horizontal parallel shafts with the saws of the respective pairs staggered and slightly overlapping; feeding mechanism for depositing individual stalks between the saws; a plurality of stationary ribs between one series of saws; a plurality of floating ribs between the other series of saws; and dogs connected to the ribs and adapted to be operated by the floating ribs to eject the decorticated stalks.

7. In a decorticating machine of the character described, a series of pairs of cooperating saws for removing fibrous bark and arranged on horizontal parallel shafts with the saws of the respective pairs slightly overlapping; feeding mechanism for depositing individual stalks between the saws; a plurality of stationary ribs between one series of saws; a plurality of floating ribs between the other series of saws; and means connected to rotate the saws in the same direction to impart rotation to a stalk engaged therein.

8. In a decorticating machine of the character described, a series of pairs of circular saws with the saws of each pair opposed to and overlapping each other, feeding mechanism for depositing individual stalks between the saws; a plurality of stationary ribs between one series of saws; a plurality of floating ribs between the other series of saws; dogs connected to the ribs and adapted to be operated by the floating ribs to eject the decorticated stalks; and cam means connected to reciprocate the floating ribs and operate the dogs in timed relation to the feeding mechanism.

9. In a decorticating machine of the character described, a series of pairs of circular saws with the saws of each pair opposed to and overlapping each other, feeding mechanism for depositing individual stalks between the saws; a plurality of stationary ribs between one series of saws; a plurality of floating ribs between the other series of saws; dogs connected to the ribs and adapted to be operated by the floating ribs to eject the decorticated stalks; and cam means connected to reciprocate the coating ribs and operate the dogs in timed relation to the feeding mechanism, each dog engaging a decorticated stalk to force against one set of the saws and away from the other set during the ejection of the stalk.

10. In a machine for decorticating freshly-cut ramie, a multiplicity of pairs of circular saws with the saws of each pair horizontally opposed and overlapping each other to provided a substantially V-shaped space above the overlapped portions for receiving a ramie stalk; power means connected to rotate the saws in the same direction and with their teeth pointing in the direction of rotation; means to feed the stalks, one at a time between the saws; means to confine a stalk between the saws and to limit the depth of penetration of the teeth into the stalk, so that the teeth will snatch off the fibers; means to remove stripped fibers from the saw teeth; and operating means for said confining means timed with respect to the rotation of the saws to eject a stripped stalk from its engaged position and permit the teeth of one set of the saws to throw it out of the machine.

HERMAN W. HAWKER.
JAMES L. WHITE.